United States Patent
Oiyama et al.

(10) Patent No.: US 7,467,797 B2
(45) Date of Patent: Dec. 23, 2008

(54) LIP-TYPE SEAL

(75) Inventors: Koichiro Oiyama, Tokyo (JP); Yasuhiro Ikeda, Tokyo (JP); Hajime Ichiyasu, Tokyo (JP); Ichiro Miyai, Tokyo (JP); Takeshi Yamada, Aichi (JP); Masami Osako, Aichi (JP)

(73) Assignees: Eagle Industry Co., Ltd., Tokyo (JP); Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 10/552,063

(22) PCT Filed: Apr. 5, 2004

(86) PCT No.: PCT/JP2004/004887

§ 371 (c)(1),
(2), (4) Date: Oct. 5, 2005

(87) PCT Pub. No.: WO2004/090391

PCT Pub. Date: Oct. 21, 2004

(65) Prior Publication Data

US 2006/0208428 A1    Sep. 21, 2006

(30) Foreign Application Priority Data

Apr. 7, 2003  (JP) .............................. 2003-102432

(51) Int. Cl.
*F16J 15/32* (2006.01)
(52) U.S. Cl. ..................................... 277/553; 277/560

(58) Field of Classification Search ................. 277/549, 277/553, 560, 562, 564, 572
See application file for complete search history.

(56) References Cited

U.S. PATENT DOCUMENTS

| 4,167,981 | A | * | 9/1979 | Bertin ......................... 277/560 |
| 4,623,153 | A | * | 11/1986 | Nagasawa ..................... 277/551 |
| 4,643,436 | A | * | 2/1987 | Jackowski .................. 29/527.1 |
| 5,713,579 | A | * | 2/1998 | Petrak et al. ................. 277/353 |
| 5,884,919 | A | * | 3/1999 | Saito ........................... 277/562 |
| 6,123,514 | A | * | 9/2000 | Kawaguchi et al. ....... 417/222.2 |
| 6,206,380 | B1 | * | 3/2001 | Miyazaki ..................... 277/551 |

(Continued)

FOREIGN PATENT DOCUMENTS

JP         2001-50397          2/2001

(Continued)

*Primary Examiner*—Patricia L Engle
*Assistant Examiner*—Gilbert Y Lee
(74) *Attorney, Agent, or Firm*—Wenderoth, Lind & Ponack, L.L.P.

(57) ABSTRACT

The lip-type seal of the present invention includes a seal ring made of an elastic material so as to have an annular fitted part that is fitted to a housing and a lip part that extends from the fitted part inwardly in a radial direction in the shape of a substantially conical ring and that is brought into contact with a shaft, and a support ring including an annular joint part joined to the fitted part and an annular supporting part that defines a hole through which the shaft passes, that extends from a side of the joint part to a halfway area of the lip part, and that supports the lip part from inside in a radial direction. The lip part is tapered in cross section from an area from which non-contact with the supporting part starts toward an end thereof.

4 Claims, 10 Drawing Sheets

U.S. PATENT DOCUMENTS

| | | |
|---|---|---|
| 6,367,811 B1 | 4/2002 | Hosokawa et al. |
| 2001/0030398 A1 | 10/2001 | Hosokawa et al. |

FOREIGN PATENT DOCUMENTS

| | | |
|---|---|---|
| JP | 2001-74145 | 3/2001 |
| JP | 2002-31244 | 1/2002 |
| JP | 3346743 | 9/2002 |
| JP | 2003-97722 | 4/2003 |

* cited by examiner

FIG.8

(Rv=8,000rpm, Pf=5.8MPa, D1=9mm)

LIP-TYPE SEAL

TECHNICAL FIELD

The present invention relates to a lip-type seal for withstanding pressure, and, more particularly, to a lip-type seal with which a space between a housing and a rotational shaft of an air conditioning compressor used in an air conditioning system of, for example, a vehicle is sealed.

BACKGROUND ART

In a conventional compressor mounted on, for example, a vehicle, in order to seal a periphery of a rotational shaft protruding from its housing outwardly, a lip-type seal is fitted between the housing and the rotational shaft so as to isolate an internal space (fluid) F in the housing from atmosphere A.

An example of such a known lip-type seal is shown in FIG. 1. This lip-type seal is made up of a seal ring 1 and a support ring 2. The seal ring 1 is made of an elastic material like rubber so as to define a fitted part 1*a* fitted to a hole Ha of a housing H, and a lip part 1*b* conically extending from the fitted part la inwardly in a radial direction. The support ring 2 includes a joint part 2*a* joined to the fitted part la and a supporting part 2*b* that extends from the joint part 2*a* to a middle of the lip part 1*b* and that supports the lip part 1*b* from inside (see Japanese Patent No. 3346743, for example).

In this lip-type seal, the lip part 1*b* of the seal ring 1 is supported by the supporting part 2*b* of the support ring 2 from inside, and, in order to improve rigidity of the lip part 1*b*, the lip part 1*b* is formed to have substantially the same thickness from its root side to its end.

Additionally, even when pressure applied by a fluid F is high, the end of the lip part 1*b* is kept in line contact with an outer peripheral surface of a rotational shaft S by controlling the lip part 1*b* so that the lip part 1*b* can hardly be deformed.

However, if $CO_2$ or the like is used as a refrigerant of the compressor, the seal is placed in a high-pressure environment of at least 5 MPa in regular use. Therefore, a conventional problem resides in that the lip part 1*b* is increasingly worn out, and durability is lowered in spite of the fact that the lip part 1*b* is supported by the support ring 2.

The present invention has been made in consideration of this problem of this conventional seal, and it is an object of the present invention to provide a lip-type seal capable of securing sealability in a high-pressure environment and having excellent durability in a simple structure.

SUMMARY OF THE INVENTION

To achieve the above-mentioned object, the present inventors have diligently performed research, and, as a result, have found that, from a viewpoint of durability, it is more desirable to expand a contact width of a lip part in a high-pressure environment, although it is conventional common sense to maintain a line-contact state in order to secure sealability.

In more detail, a lip-type seal of the present invention that achieves the above-mentioned object is a lip-type seal with which an outer periphery of a shaft supported by a predetermined housing is sealed. The lip-type seal includes a seal ring and support ring. The seal ring is made of an elastic material so as to define an annular fitted part that is fitted to the housing, and a lip part that extends from the fitted part inwardly in a radial direction in a shape of a substantially conical ring and that is brought into contact with the shaft. The support ring includes an annular joint part joined to the fitted part and an annular supporting part that defines a hole through which the shaft passes, and that extends from a side of the joint part to a halfway area of the lip part and supports the lip part from inside in the radial direction. In this lip-type seal, the lip part is tapered in cross section from an area from which non-contact with the supporting part of the support ring starts toward a tip end thereof.

According to this structure, the lip part of the seal ring in an area deviating from the supporting part of the support ring is appropriately deformed and brought into contact with the shaft in a state of having a greater contact width with the shaft when the lip part of the seal ring is exposed to a high-pressure environment. Hence, appropriate surface pressure under which sealability is secured is obtained, and the surface pressure is dispersed to lower a maximum surface pressure. As a result, wear of the lip part is reduced, and durability is improved.

Preferably, in the above structure, the lip part is formed so that a value $\alpha = T0/T1$ falls within 0.3 to 0.7 where T1 is a thickness of an area from which non-contact with the supporting part of the support ring starts, and T0 is a thickness of a tip end.

According to this structure, since the lip part of the seal ring in an area deviating from the supporting part of the support ring is formed to have a thickness satisfying the condition ($\alpha=0.3$ to 0.7), bending strength of the lip part in its entirety is uniform, and partial wear can be prevented. Therefore, sealability and durability are further improved.

Preferably, in the above structure, a value $\beta=(D1-D0)/D1$ falls within 0.03 to 0.15, where D0 is an inner diameter of the tip end of the lip part, and D1 is an outer diameter of the shaft.

According to this structure, since the end of the lip part is formed to have a tightening margin satisfying the condition ($\beta=0.03$-$0.15$), partial wear can be prevented, and sealability and durability are further improved.

Preferably, in the above structure, the lip part is formed so that the value $\alpha=T0/T1$ falls within 0.3 to 0.7, where T1 is the thickness of the area from which non-contact with the supporting part of the support ring starts, and T0 is the thickness of the tip end, and the value $\beta=(D1-D0)/D1$ falls within 0.03 to 0.15, where D0 is the inner diameter of the tip end of the lip part, and D1 is the outer diameter of the shaft.

According to this structure, since the lip part of the seal ring in the area deviating from the supporting part of the support ring is formed to have a thickness satisfying the condition ($\alpha=0.3$ to 0.7), and since the tip end of the lip part is formed to have a tightening margin satisfying the condition ($\beta=0.03$-$0.15$), bending strength of the lip part in its entirety is uniform, and partial wear can be prevented even more effectively. Therefore, sealability and durability are further improved.

Preferably, in the above structure, the supporting part of the support ring is bent so as to be convex toward a lip part side.

According to this structure, since a bent supporting part of the support ring supports the lip part of the seal ring by a not partially but uniformly gently curved surface, the lip part is urged to be deformed with a gentle slope in a high-pressure environment, and the contact surface pressure can be made more uniform.

Preferably, in the above structure, the lip part of the seal ring is 85 degrees to 98 degrees in material hardness according to JIS (Duro-A) hardness.

According to this structure, a contact state between the lip part of the seal ring and the shaft can be kept optimum, and abrasion resistance and durability are further improved.

BRIEF DESCRIPTION OF DRAWINGS

FIG. 8 shows results of an endurance test of the lip-type seal according to the present invention.

DETAILED DESCRIPTION OF THE PREFERRED EMBODIMENTS

Preferred embodiments of the present invention will be hereinafter described with reference to the attached drawings. Herein, a description will be given of a case in which a lip-type seal according to the present invention is used in an air conditioning compressor serving as a part of an air conditioning system of, for example, a vehicle.

The compressor has a housing H that defines an outline and a rotational shaft S that transmits a rotational driving force to a compression mechanism contained in the housing H from outside. A lip-type seal 10 according to the present invention is attached so as to seal a space between the rotational shaft S (more specifically, an outer circumferential surface of the rotational shaft S) and the housing H (more specifically, an inner wall surface of a hole of the housing H), whereby an internal space (fluid) F is blocked from atmosphere A.

Figure 2:
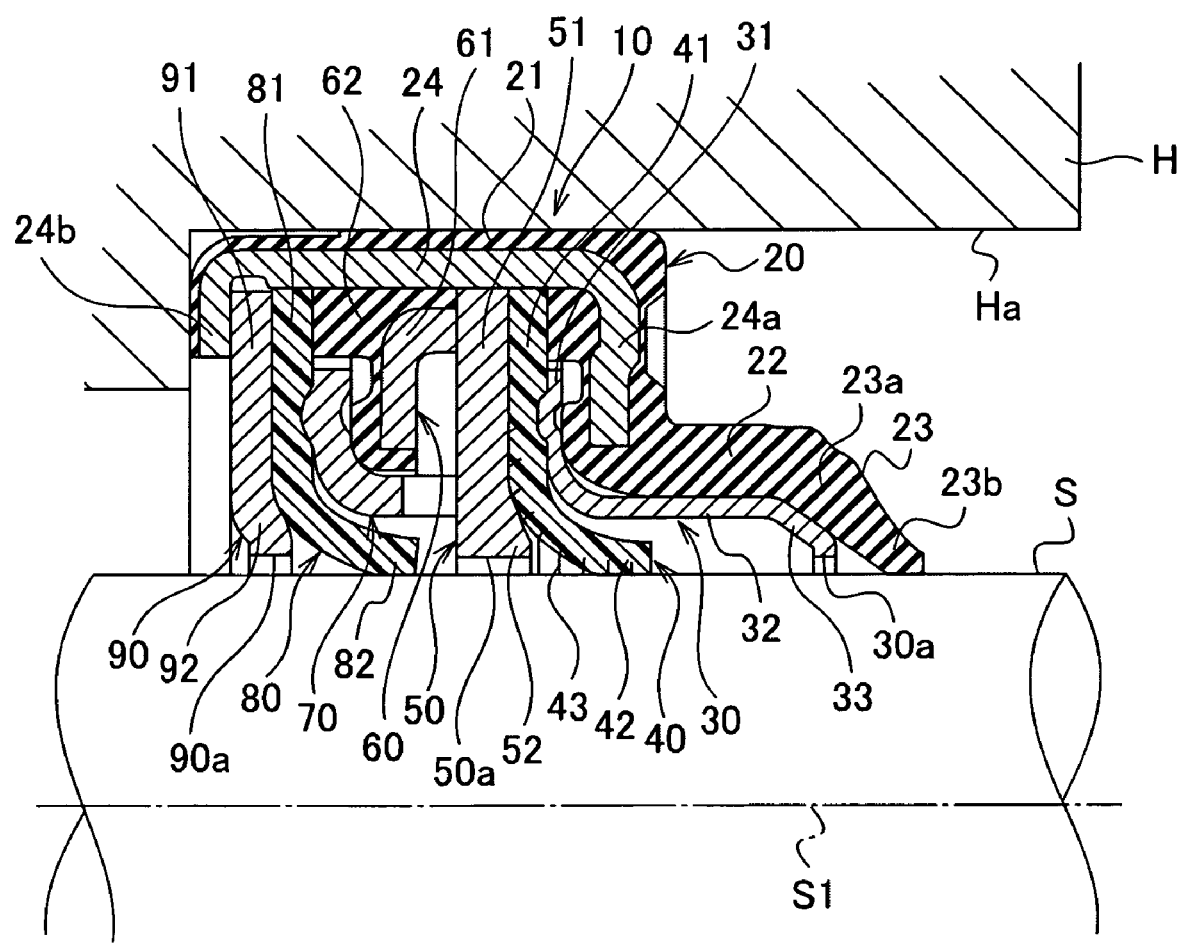
FIG. 2 is a partially sectional view showing a state in which a lip-type seal according to the present invention has been attached between a rotational shaft and a housing of a compressor.
Figure 3:
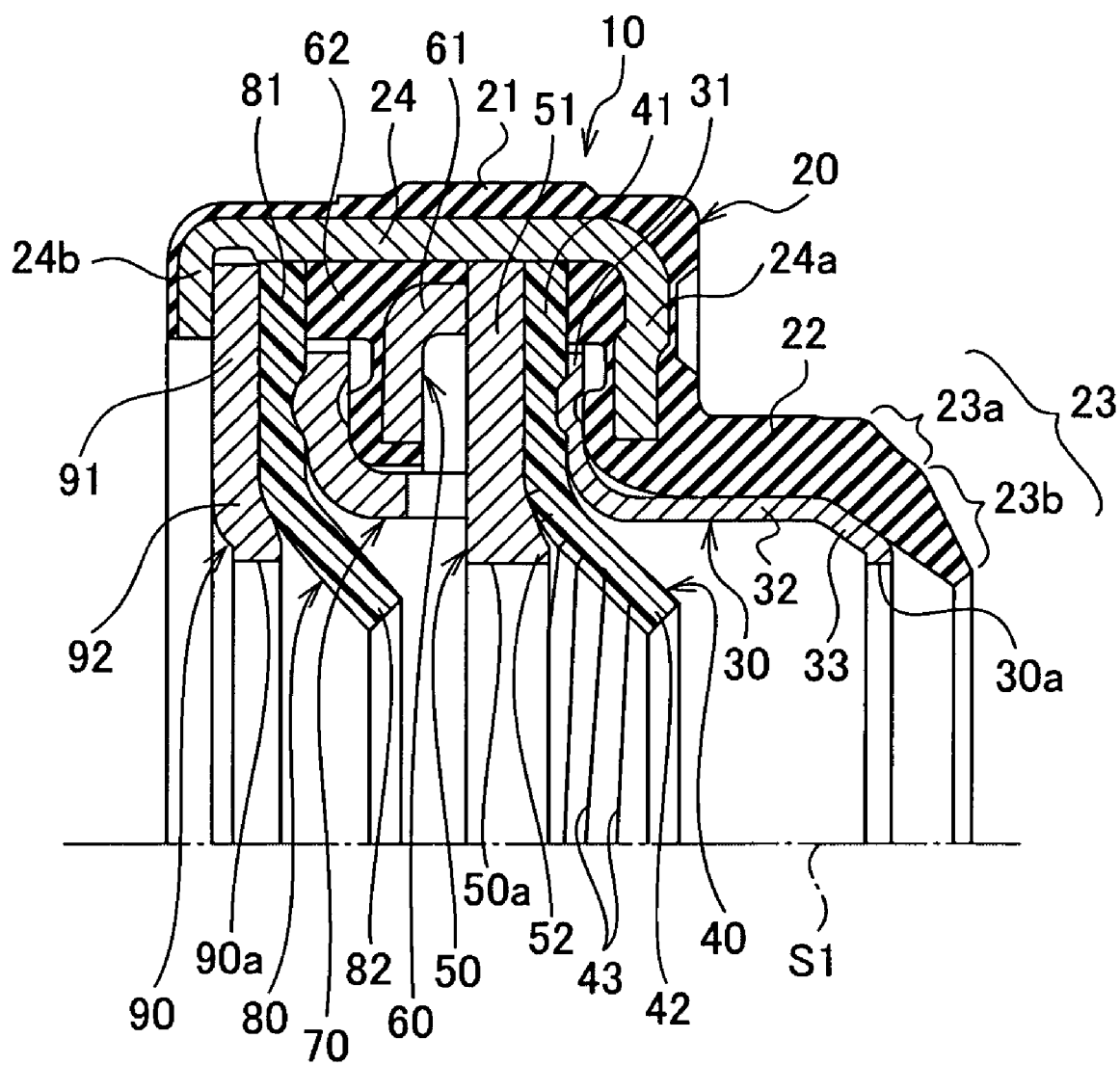
FIG. 3 is a partially sectional view showing a state in which the lip-type seal according to the present invention has not yet been attached.

As shown in FIG. 2 and FIG. 3, the lip-type seal 10 includes a seal ring 20 that defines an outline and that faces the internal space (fluid) F and a support ring 30 joined to an inside of the seal ring 20 as a basic structure. In addition to the seal ring 20 and the support ring 30 that constitute the basic structure, the lip-type seal 10 further includes a second seal ring 40, a second support ring 50, a spacer ring 60, a holder ring 70, a third seal ring 80, and a third support ring 90, which are sequentially arranged and joined following the support ring 30 in an axial direction S1 of the rotational shaft S.

The seal ring 20 is made of a rubber material, and, as shown in FIG. 2 and FIG. 3, is made up of a fitted part 21 that is fitted to hole Ha of the housing H, a cylindrical part 22 that extends from the fitted part 21 to the internal space F in the axial direction S1, and a lip part 23 that substantially conically extends to make a predetermined tilt angle from the cylindrical part 22 inwardly in a radial direction and that comes into contact with the rotational shaft S (more specifically, a circumferential surface of the rotational shaft S).

The fitted part 21 has a metal ring 24 that is embedded therein and that is formed integrally therewith. The metal ring 24 is cylindrically shaped and includes a flange part 24a directed inwardly in the radial direction and a caulking part 24b so as to heighten a strength of the fitted part 21. After all components are assembled, the caulking part 24b is molded by performing a caulking process, and all components are fixed.

The cylindrical part 22 serves to integrally connect the fitted part 21 and the lip part 23 together. A length of the cylindrical part 22 in the axial direction S1 is appropriately selected. In other words, the cylindrical part 22 is placed to extend the lip part 23 from the fitted part 21 inwardly in the radial direction. The cylindrical part 22 may be made short so that the lip part 23 adjoins the fitted part 21.

Figure 4A:
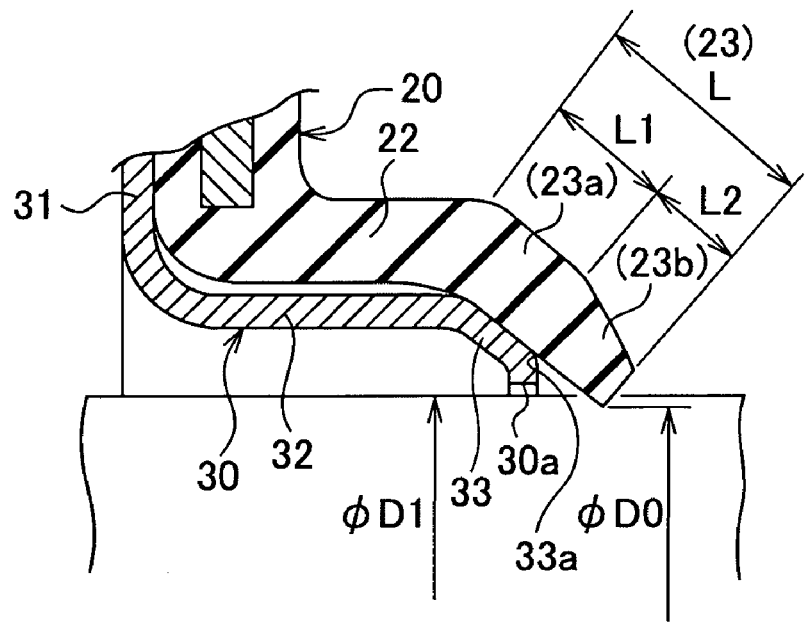
FIG. 4A and FIG. 4B are enlarged sectional views, each showing a part of the lip-type seal of FIG. 3.
Figure 4B:
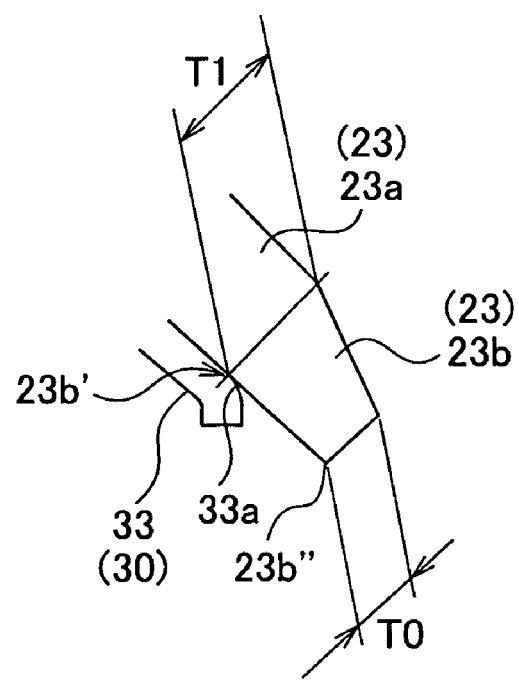

As shown in FIG. 3, FIG. 4A, and FIG. 4B, the lip part 23 has a length of an area L as a whole, and consists of a base part 23a (area L1) having almost the same thickness and an end part 23b (area L2) integrally formed following the base part 23a. Herein, the end part 23b (area L2) has nearly half the length of the e lip part 23 in its entirety (area L).

As shown in FIG. 4B, the end part 23b is cross-sectionally tapered from a terminal of the base part 23a, i.e., from an area 23b' that begins non-contact with a supporting part 33, which is described later, of the support ring 30 toward a tip end 23b".

Since the lip part 23 is thus provided with this cross-sectionally tapered end part 23b, the lip part 23 (end part 23b) is appropriately deformed, and is brought into contact with the rotational shaft S in a state in which a contact width with the rotational shaft S has been expanded (i.e., in a close contact state) when pressure in the internal space F is high. As a result, appropriate surface pressure by which sealability is secured is obtained, and surface pressure is dispersed to lower a maximum surface pressure. Therefore, a wear-out of the lip part is reduced, and durability is heightened.

Herein, the lip part 23 (the end part 23b) is formed so that a value $\alpha = T0/T1$ falls within 0.3 to 0.7, preferably 0.35 to 0.65, where T1 is a thickness of the area 23b' that begins non-contact with the supporting part 33 of the support ring 30 described later (i.e., a thickness of the base part 23a), and T0 is a thickness of the tip end 23b" as shown in FIG. 4B.

Hence, bending stress caused in an entire area of the lip part 23 is uniform. That is, bending strength is uniform so as to prevent the lip part 23 from being deformed in an anomalous manner. As a result, partial wear can be prevented, and sealability and durability are further improved.

Additionally, the lip part 23 is formed so that a value $\beta = (D1-D0)/D1$ falls within 0.03 to 0.15, preferably 0.04 to 0.12, where D0 is an inner diameter of the tip end 23b" and D1 is an outer diameter of the rotational shaft S, as shown in FIG. 4A.

Hence, a tightening margin is kept in a preferable state when the tip end 23b" of the lip part 23 is compressed by the rotational shaft S. As a result, partial wear can be prevented, and sealability and durability are further improved.

An elastically deformable material, such as a hard, H-NBR-based rubber material, is used as material of the seal ring 20. Hardness of the material of the lip part 23 of the seal ring 20 falls within 85 degrees to 98 degrees, preferably 90 degrees to 98 degrees, according to hardness (Duro-A) of JIS (Japan Industrial Standards).

Since the hardness is set in this manner, a contact state between the lip part 23 (the end part 23b) of the seal ring 20 and the rotational shaft S can be optimally maintained, and abrasion resistance and durability are further improved.

Without being limited to rubber material, a resinous material may be used as the material of the seal ring 20 as long as the material is elastically deformed in an appropriate manner under high pressure.

The support ring 30 is made of metal or a hard resinous material, and, as shown in FIG. 2 and FIG. 3, is made up of an annular joint part 31 that is joined to the fitted part 21 of the seal ring 20, a cylindrical part 32 that defines a circular hole 30a through which the rotational shaft S passes and that extends from the joint part 31 to an internal space F side in the axial direction S1, and a supporting part 33 that extends from the cylindrical part 32 inwardly in the radial direction in the shape of a substantially conical ring.

The cylindrical part 32 is disposed to be in contact or non-contact with an inner wall surface of the cylindrical part 22 of the seal ring 20. The supporting part 33 extends from a side of the joint part 31 to a halfway area of the lip part 23, i.e., to the base part 23a (area L1) of the lip part 23, and supports the lip part 23 from inside in the radial direction.

As shown in FIG. 4A and FIG. 4B, an end area 33a of the supporting part 33 is bent so as not to exert an edge action onto the lip part 23 that has been pressed and deformed by high pressure (i.e., so as not to partially have a rise in stress).

The second seal ring 40 is made of a resinous material, such as PTFE, and, as shown in FIG. 2 and FIG. 3, is made up of an annular joint part 41 that is joined to the seal ring 20 while sandwiching the joint part 31 of the support ring 30, and a lip part 42 that extends from the joint part 41 inwardly in the radial direction in the shape of a substantially conical ring at a predetermined tilt angle and that can come into contact with the rotational shaft S (more specifically, the outer circumferential surface of the rotational shaft S).

A screw-like spiral cut 43 is formed in an inner wall surface of the lip part 42 (i.e., in an area being in contact with the outer circumferential surface of the rotational shaft S). The spiral cut 43 serves to push back a sealed fluid into the internal space F by a screw pump action.

The second support ring 50 is made of metal or a hard resinous material, and, as shown in FIG. 2 and FIG. 3, is made up of an annular joint part 51 that defines a circular hole 50a through which the rotational shaft S passes and that is joined to the joint part 41 of the second seal ring 40, and an annular supporting part 52 that protrudes from the joint part 51 toward the internal space F in the axial direction S1.

As shown in FIG. 2 and FIG. 3, the spacer ring 60 is made up of a metal ring 61 formed substantially in the shape of the letter L in cross section and an annular rubber-made packing 62 integrally fixed to the metal ring 61. The metal ring 61 is joined to the joint part 51 of the second support ring 50, and the annular packing 62 is fitted to an inner circumferential surface (metal ring 24) of the seal ring 20. In other words, as a result of fitting the spacer ring 60 thereto, the support ring 30, the second seal ring 40, and the second support ring 50 are sandwiched and fixed inside the seal ring 20.

As shown in FIG. 2 and FIG. 3, the holder ring 70 is made of metal or a hard resinous material so as to be substantially in the shape of the letter L in cross section, and is incorporated so as to be fitted to the annular packing 62 of the spacer ring 60.

The third seal ring 80 is made of a resinous material, such as PTFE, and, as shown in FIG. 2 and FIG. 3, is made up of an annular joint part 81 that is joined to the holder ring 70 and to the annular packing 62, and a lip part 82 that extends from the joint part 81 inwardly in the radial direction in the shape of a substantially conical ring at a predetermined tilt angle and that can come into contact with the rotational shaft S (more specifically, the outer circumferential surface of the rotational shaft S).

The third support ring 90 is made of metal or a hard resinous material, and, as shown in FIG. 2 and FIG. 3, is made up of an annular joint part 91 that defines a circular hole 90a through which the rotational shaft S passes and that is joined to the joint part 81 of the third seal ring 80, and an annular supporting part 92 that protrudes from the joint part 91 toward the internal space F in the axial direction S1.

The joint part 91 is pressed by the caulking part 24b of seal ring 20 against the joint part 81 of the third seal ring 80, and is fixed firmly.

A description will now be given of an assemblage of the components of the lip-type seal 10 structured as above. First, the seal ring 20 in which the caulking part 24b has not yet been bent (i.e., that has not yet been subjected to a caulking process) is prepared. Thereafter, the support ring 30, the second seal ring 40, the second support ring 50, the spacer ring 60, the holder ring 70, the third seal ring 80, and the third support ring 90 are piled in this order while being fitted thereto. A caulking process is then performed to form the caulking part 24b.

As a result, the support ring 30, the second seal ring 40, the second support ring 50, the spacer ring 60, the holder ring 70, the third seal ring 80, and the third support ring 90, which have been inserted in this order, are all sandwiched and fixed by the seal ring 20, thus completing the lip-type seal 10.

Figure 1:
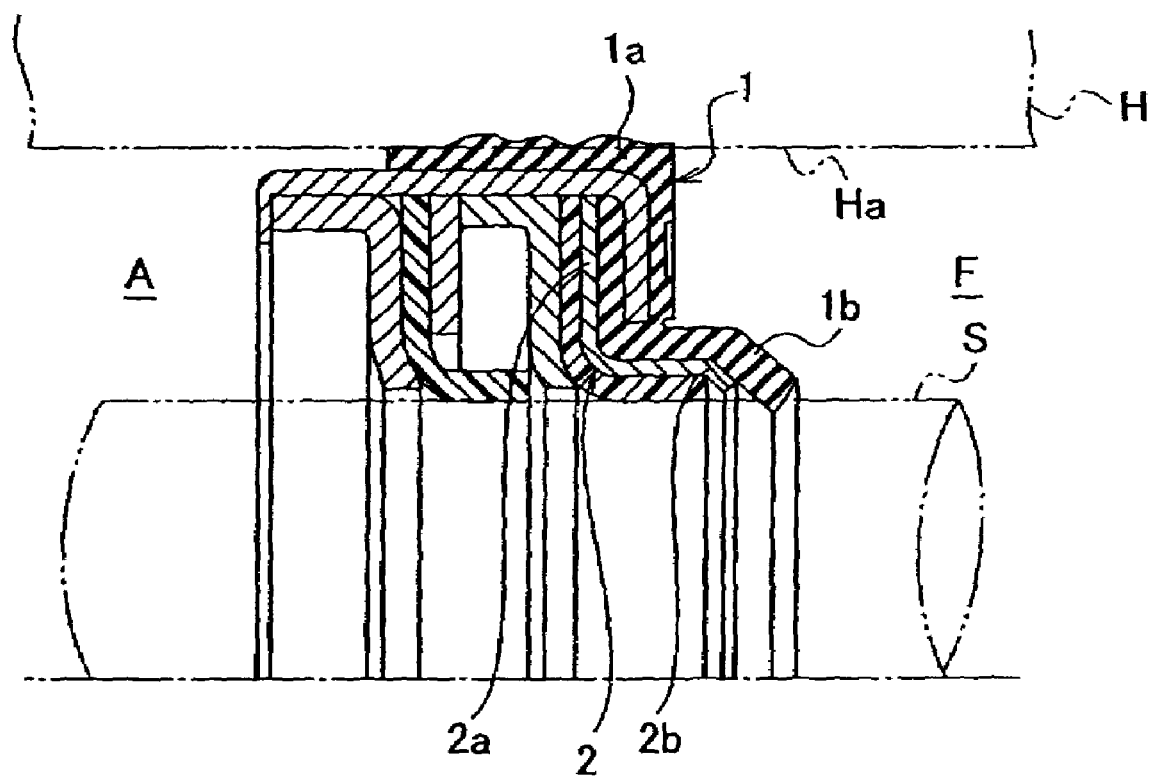
FIG. 1 is a partially sectional view showing a conventional lip-type seal.
Figure 5A:
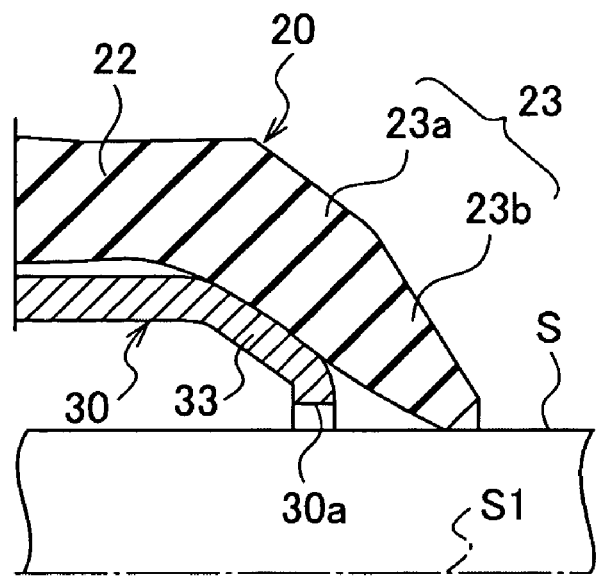
FIG. 5A is a partially sectional view showing a state in which pressure is not applied to a lip part of the lip-type seal according to the present invention.
Figure 5B:
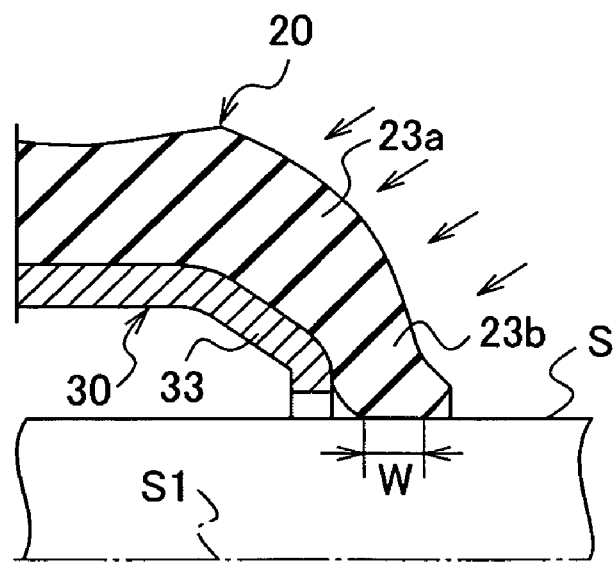
FIG. 5B is a partially sectional view showing a state in which high pressure is applied to the lip part.
Figure 5C:
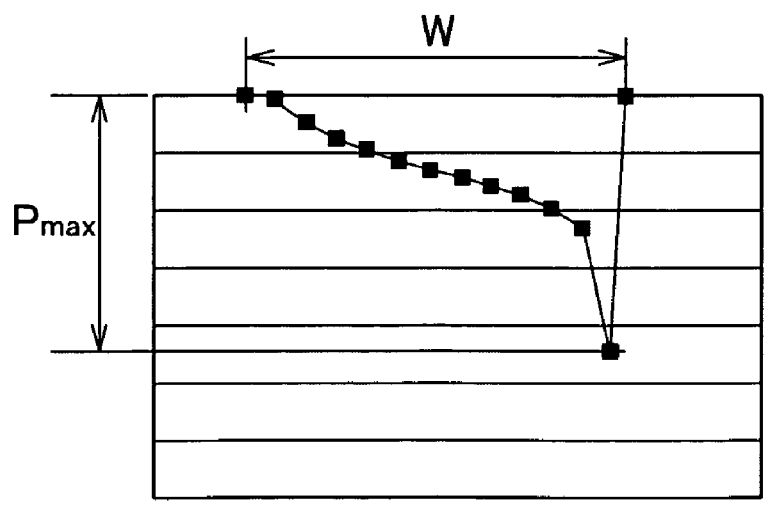
FIG. 5C shows a surface-pressure distribution on a seal surface in the state of FIG. 5B.
Figure 6A:
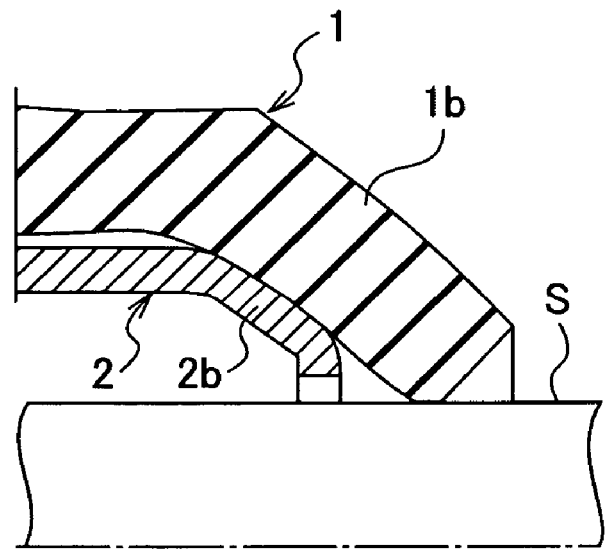
FIG. 6A is a partially sectional view showing a state in which pressure is not applied to a lip part of the conventional lip-type seal.
Figure 6B:
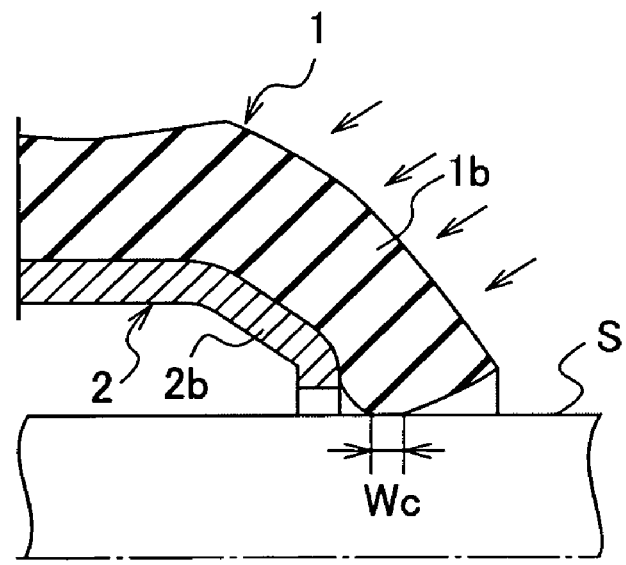
FIG. 6B is a partially sectional view showing a state in which high pressure is applied to the lip part.
Figure 6C:
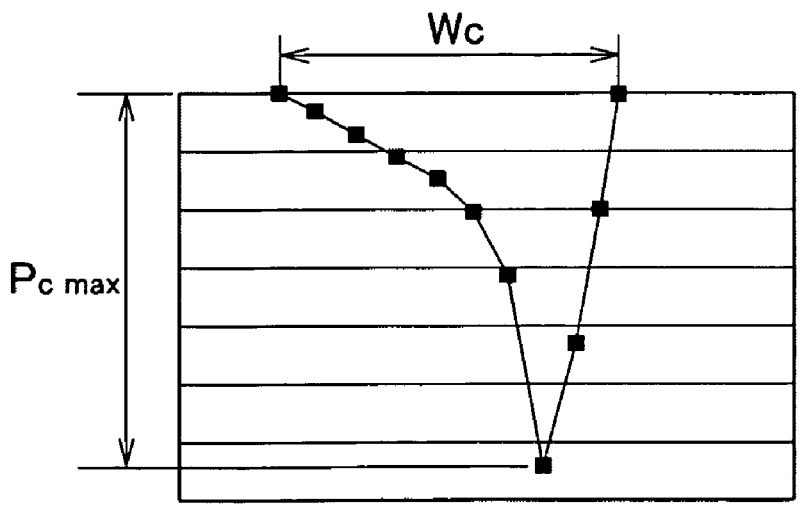
FIG. 6C shows a surface-pressure distribution on a seal surface in the state of FIG. 6B.

Here, a deformation of the lip-type seal 10 structured as above and a surface-pressure distribution of a seal surface will be shown in FIG. 5A to FIG. 5C, and a deformation and a surface-pressure distribution of a seal surface of the conventional lip-type seal of FIG. 1, which is employed as a comparative example, will be shown in FIG. 6A to FIG. 6C.

In the lip-type seal 10 of the present invention, the lip part 23 linearly extends and comes into narrow-width contact with the rotational shaft S while being supported by the supporting part 33 of the support ring 30 as shown in FIG. 5A when high pressure is not applied to the lip part 23, whereas the end part 23b of the lip part 23 is appropriately elastically deformed so that a contact width W with which the lip part 23 comes into contact with the rotational shaft S becomes greater as shown in FIG. 5B when high pressure is applied to the lip part 23.

In contrast, in the conventional lip-type seal, the lip part 1b linearly extends and comes into narrow-width contact with the rotational shaft S while being supported by the supporting part 2b of the support ring 2 as shown in FIG. 6A when high pressure is not applied to the lip part 1b, whereas the end part of the lip part 1b is slightly elastically deformed as shown in FIG. 6B when high pressure is applied to the lip part 1b, but, fundamentally, the lip part 1b is not easily deformed, and hence a contact width with which the lip part 1b comes into contact with the rotational shaft S is slightly enlarged to have a width Wc. Therefore, as shown in FIG. 6C, a maximum surface pressure Pcmax becomes remarkably high, so that the lip-type seal will increasingly wear out.

On the other hand, the surface pressure of a contact area W (seal surface) in the lip-type seal 10 of the present invention has a gentler slope than the conventional one (see FIG. 6C) as shown in FIG. 5C, so that surface pressure is uniform, and maximum pressure Pmax (<Pcmax) is appropriately lowered.

Since the contact width W is enlarged in this manner, the surface pressure on the seal surface is dispersed, and wear is reduced, and, as a result, durability is improved. Additionally, since some degree of surface pressure is obtained over an entire seal surface, and since appropriate surface pressure is maintained without extremely lowering a maximum pressure, excellent sealability can be obtained.

Figure 7A:
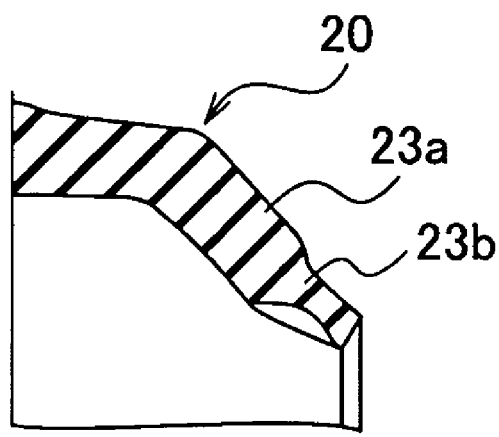
FIG. 7A is a partially sectional view showing "scooped wear-out" that occurs in a lip part of a lip-type seal.
Figure 7B:
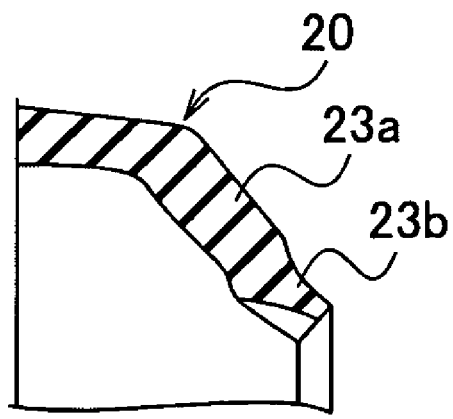
FIG. 7B is a partially sectional view showing wear-out that occurs when the lip part of the lip-type seal causes a "toppling phenomenon."

Additionally, in the lip part 23 of the seal ring 20, a thickness thereof or a tightening margin thereof is set to preferably satisfy the aforementioned conditions $\alpha=0.3$ to 0.7 and $\beta=0.03$ to 0.15, and hence "scooped wear-out," which will occur when the thickness thereof is small as shown in FIG. 7A, can be prevented, and wear resulting from a "toppling phenomenon," which will occur when the thickness thereof is great as shown in FIG. 7B, can be prevented.

Figure 8:
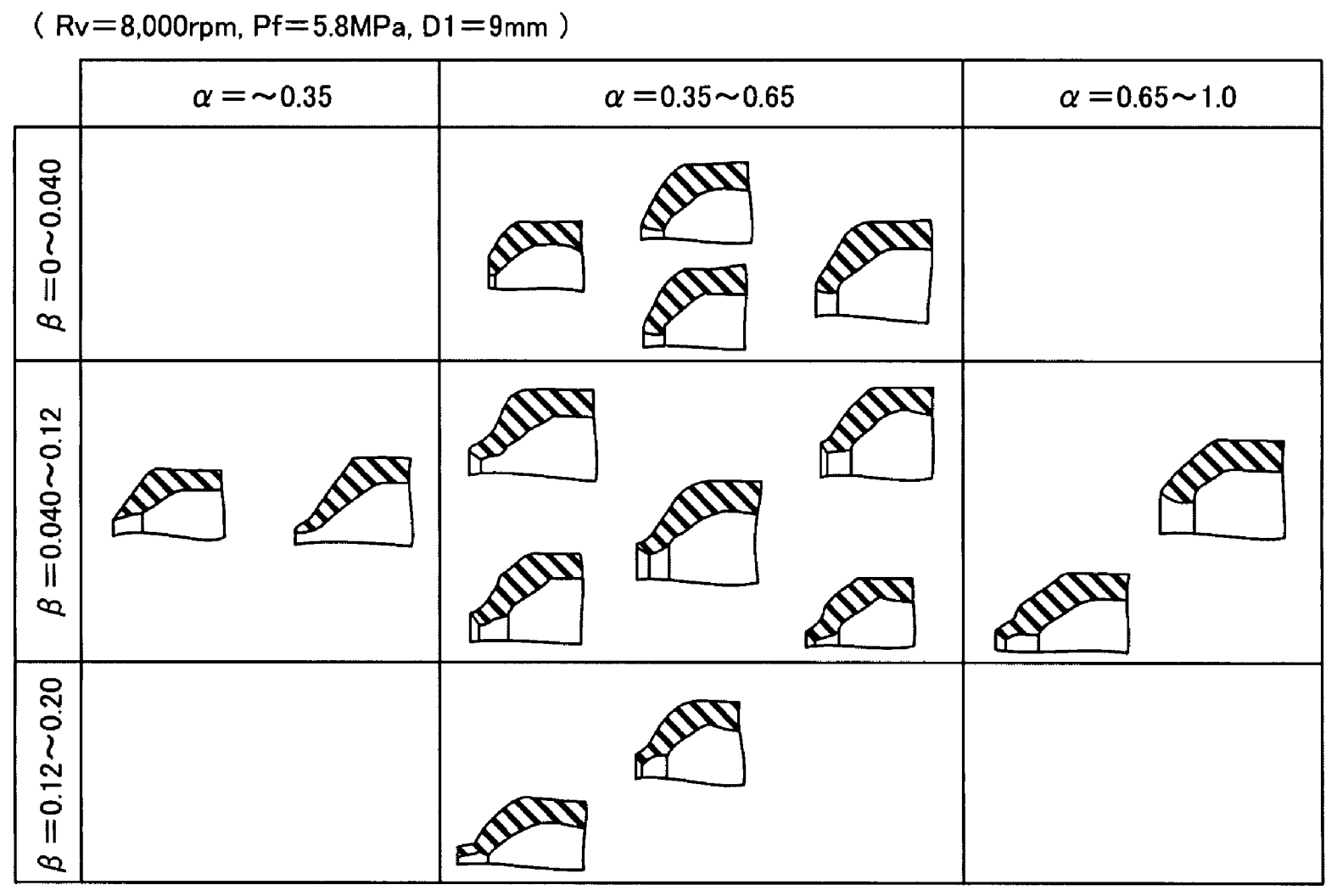

FIG. 8 shows results of an endurance test of the lip-type seal according to the present invention. In this endurance test, lip-type seals having various sizes different in terms of values $\alpha$ and $\beta$ were molded and prepared. $CO_2$ whose pressure Pf is 5.8 MPa was used as a sealed fluid with which the internal space F is filled. The rotational shaft S, whose outer diameter $\phi$ D1 is 9.0 mm, was rotated at a rotational speed Rv of 8000 rpm for a predetermined time, and a wear state of the lip part 23 was observed.

As a result, when the value $\alpha(=T0/T1)$ exceeds 0.65 as shown in FIG. 8, the "toppling phenomenon" is liable to become large. On the other hand, when the value $\alpha$ is below 0.35, a decrease in rigidity of the end part 23b becomes too great.

Consequentially, it was confirmed that the seal is preferably deformed to enlarge the contact width of the seal surface when the value $\alpha$ falls within 0.35 to 0.65.

It was further confirmed that the value $\alpha$ falling within 0.30 to 0.70 is sufficiently permissible.

Additionally, the "scooped wear-out" and the "toppling phenomenon" are also affected by a tightening margin with respect to the rotational shaft S, and, when the value $\beta(=(D1-D0)/D1)$ is below 0.04, initial deformation is small, so that the "toppling phenomenon" easily occurs. On the other hand, when the value $\beta$ exceeds 0.12, the influence of the "scooped wear-out" is liable to increase.

Consequentially, it was confirmed that anomalous deformation is prevented, and the seal is preferably deformed to enlarge the contact width of the seal surface when the value $\beta$ falls within 0.04 to 0.12.

It was further confirmed that the value $\beta$ falling within 0.03 to 0.15 is sufficiently permissible.

Figure 9:
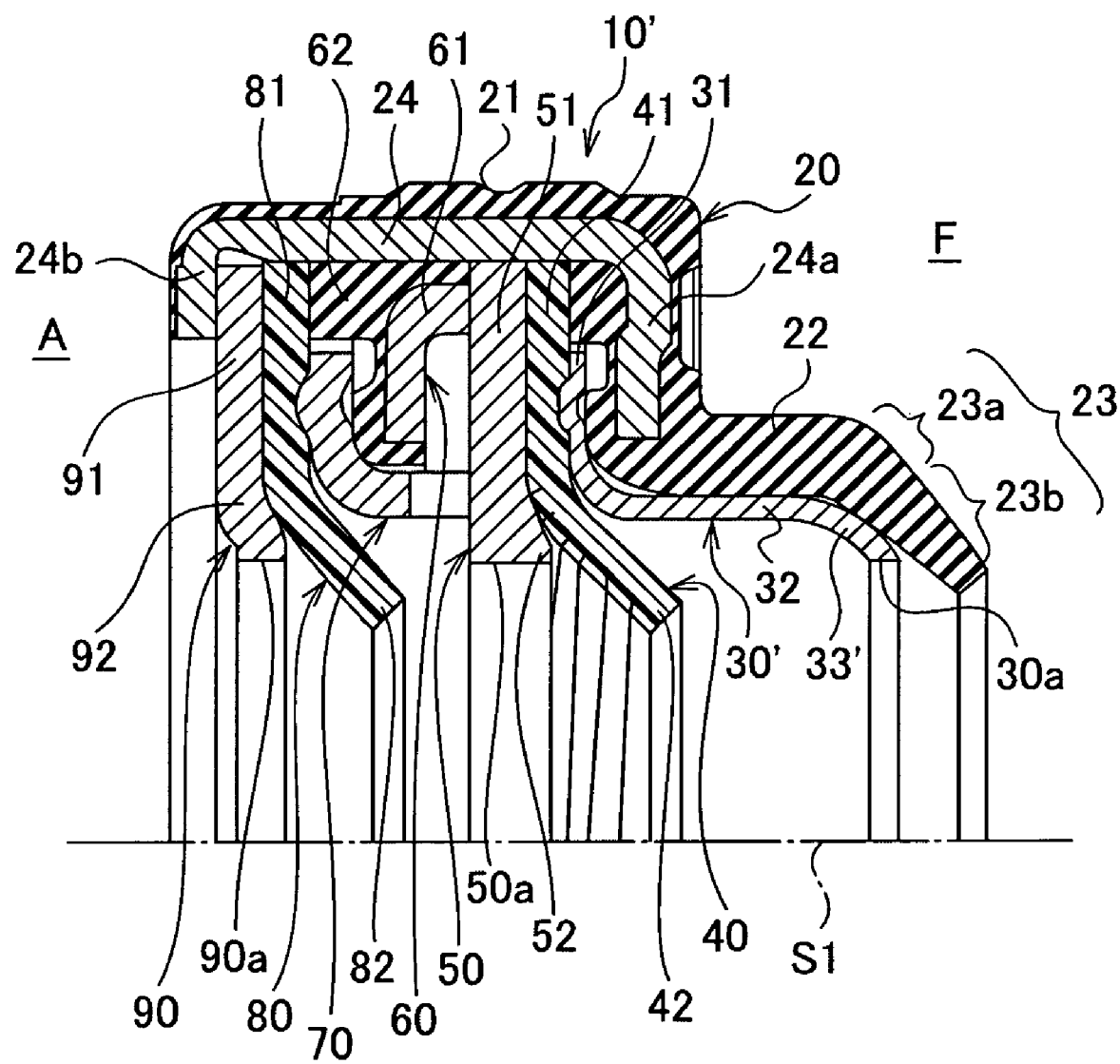
FIG. 9 is a partially sectional view showing another embodiment of the lip-type seal according to the present invention in which the seal has not yet been attached.
Figure 10A:
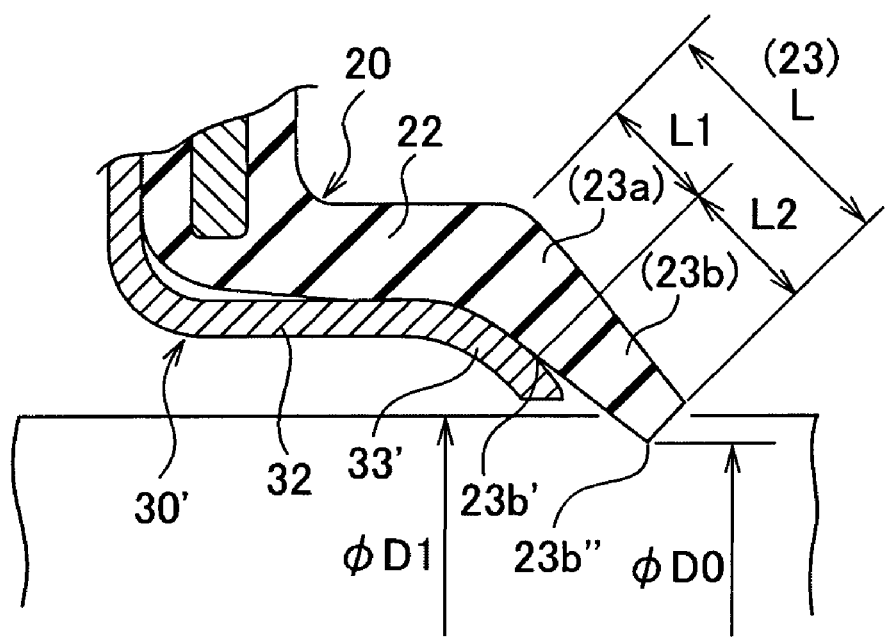
FIG. 10A and FIG. 10B are enlarged sectional views, each showing a part of the lip-type seal of FIG. 9.
Figure 10B:
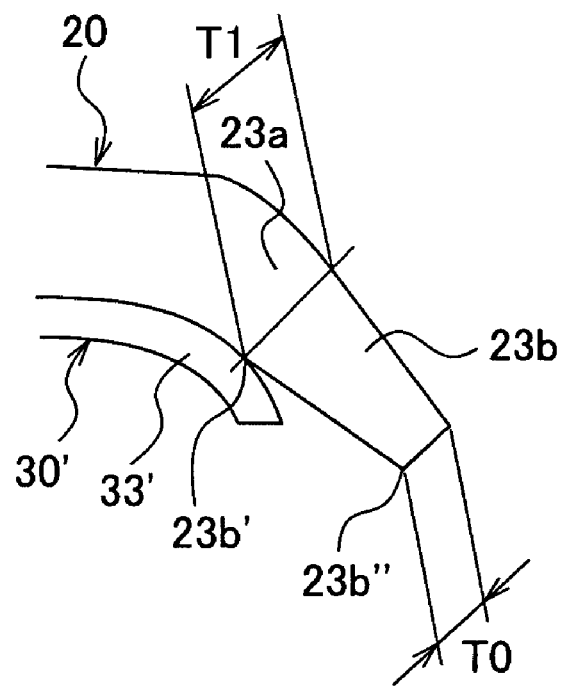

FIG. 9 and FIG. 10 show another embodiment of the lip-type seal according to the present invention. The same reference symbol as in the foregoing embodiment is given to the same structure, and a description thereof is omitted.

As shown in FIG. 9, a lip-type seal 10' according to this embodiment includes a seal ring 20 that defines an outline and that faces the internal space (fluid) F side, and a support ring 30' joined to an inside of the seal ring 20 as a basic structure. In addition to the seal ring 20 and the support ring 30' that constitute the basic structure, the lip-type seal 10' further includes a second seal ring 40, a second support ring 50, a spacer ring 60, a holder ring 70, a third seal ring 80, and a third support ring 90, which are sequentially arranged and joined following the support ring 30' in an axial direction S1 of the rotational shaft S.

The support ring 30' is made of metal or a hard resinous material. As shown in FIG. 9 and FIG. 10, the support ring 30' is made up of, as in the foregoing embodiment, a joint part 31, a cylindrical part 32, and a supporting part 33' that extends from the cylindrical part 32 in the shape of a substantially conical ring while being bent inwardly in a radial direction. The supporting part 33' is bent so as to be convex toward the lip part 23.

Therefore, since this bent supporting part 33' supports the lip part 23 of the seal ring 20 by virtue of a gently curved surface not partially but uniformly, the lip part 23 is urged to be deformed with a gentle slope in a high-pressure environment, and a contact surface pressure can be made more uniform. Therefore, as in the foregoing embodiment, a contact state between the lip part 23 of the seal ring 20 and the rotational shaft S can be optimally maintained, and abrasion resistance and durability are improved.

In the above embodiments, the lip-type seals 10 and 10' include the two seal rings 40 and 80 and the two support rings 50 and 90 besides the seal ring 20 and the support ring 30. However, without being limited to this structure, the present invention can be applied to a structure including a single seal ring and a single support ring besides the seal ring 20 and the support ring 30, or a structure including only the seal ring 20 and the support ring 30.

In the above embodiments, the lip-type seals 10 and 10' are used in a compressor serving as a part of an air conditioning system of, for example, a vehicle. However, without being limited to this, the lip-type seals 10 and 10' can be used in, for example, a machine or an electric instrument including a housing that supports a rotational shaft or a shaft reciprocating in an axial direction.

INDUSTRIAL APPLICABILITY

As described above, the lip-type seal of the present invention is characterized in that wear is reduced, and durability is improved while securing a desired sealing capability. Therefore, the lip-type seal of the present invention is suitable as a lip-type seal attached to an area exposed especially to a high-pressure environment, and is useful in a machine or an electric instrument that has a need to seal an outer periphery of a reciprocating shaft as well as a rotational shaft.

What is claimed is:

1. A seal system comprising:
   a shaft supported by a housing;
   an elastic seal ring including an annular fitted part and a lip part, said annular fitted part to be fitted into a hole of the housing, said lip part extending from said fitted part inwardly in a radial direction in the shape of a substantially conical ring that is to be brought into contact with an outer periphery of said shaft; and
   a support ring including an annular joint part joined to said annular fitted part, and an annular supporting part, said annular supporting part defining a hole through which said shaft is to pass, extending from a side of said annular joint part to a middle region of said lip part, and supporting said lip part, from inwardly of said lip part, in the radial direction,
   wherein said lip part is formed so as to extend linearly when high pressure is not applied to said lip part and be tapered in cross section from an area at which non-contact with said annular supporting part begins toward an end of said lip part, such that a value of T0/T1 falls within 0.3 to 0.7, with T1 being a thickness of said lip part at the area at which non-contact with said annular supporting part begins, and T0 being a thickness of said end of said lip part, and such that a value (D1-D0)/D1 falls within 0.03 to 0.15, with D0 being an inner diameter of said end of said lip part, and D1 being an outer diameter of said shaft.

2. The seal system according to claim 1, wherein an end of said annular supporting part is bent away from said lip part so as to define the area at which non-contact with said annular supporting part begins.

3. The seal system according to claim 2, wherein said lip part is 85 degrees to 98 degrees in material hardness according to hardness.

4. The seal system according to claim 1, wherein said lip part is 85 degrees to 98 degrees in material hardness according to hardness.

* * * * *